(12) United States Patent
Perng et al.

(10) Patent No.: US 9,925,530 B2
(45) Date of Patent: Mar. 27, 2018

(54) NANOPOROUS THIN FILM AND METHOD FOR FABRICATING THE SAME

(71) Applicant: National Tsing Hua University, Hsinchu (TW)

(72) Inventors: Tsong-Pyng Perng, Hsinchu (TW); Hsueh-Shih Chen, Hsinchu (TW); Chung-Yi Su, Hsinchu (TW); Po-Hsun Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/837,264

(22) Filed: Aug. 27, 2015

(65) Prior Publication Data

US 2016/0067697 A1    Mar. 10, 2016

(30) Foreign Application Priority Data

Sep. 5, 2014 (TW) .............................. 103130805 A

(51) Int. Cl.
| | | |
|---|---|---|
| *B01J 35/00* | (2006.01) | |
| *B01J 35/02* | (2006.01) | |
| *B01J 37/00* | (2006.01) | |
| *B01J 37/02* | (2006.01) | |
| *C02F 1/00* | (2006.01) | |
| *C02F 1/30* | (2006.01) | |

(Continued)

(52) U.S. Cl.
CPC .............. *B01J 35/004* (2013.01); *B01J 23/42* (2013.01); *B01J 35/0013* (2013.01); *B01J 35/04* (2013.01);
(Continued)

(58) Field of Classification Search
CPC ...... B01J 35/00; B01J 35/0013; B01J 35/002; B01J 35/004; B01J 35/02; B01J 35/023; B01J 37/00; B01J 37/02; B01J 37/024; B01J 37/0244; C02F 1/00; C02F 1/30; C02F 1/32; C02F 1/72; C02F 1/725;
(Continued)

(56) References Cited

U.S. PATENT DOCUMENTS

| | | | | |
|---|---|---|---|---|
| 6,902,624 B2* | 6/2005 | Seidel | ................ | C23C 16/4412 118/715 |
| 2003/0050196 A1* | 3/2003 | Hirano | ..................... | A61L 9/00 507/238 |

(Continued)

OTHER PUBLICATIONS

Elam et al., Atomic Layer Deposition for the Conformal Coating of Nanoporous Materials, 2006, Hindawi Publishing Corporation, Journal of Nanomaterials, vol. 2006, pp. 1-5.*

(Continued)

*Primary Examiner* — Natasha Young
(74) *Attorney, Agent, or Firm* — pattenttm.us

(57) ABSTRACT

The present invention relates to a nanoporous thin film and a method for fabricating the same. The nanoporous thin film fabricating method for fabricating a nanoporous thin film with a composite photocatalyst structure for a photodegradation and a water purification includes providing a porous substrate with a plurality of through-nanopores therein, each of which through-nanopores have an inner tube wall; forming an oxide-based photocatalyst layer over the porous substrate and the inner tube wall by using a first chemical-based deposition process; and forming a metal-based photocatalyst layer on a part of the oxide-based photocatalyst layer by using a second chemical-based deposition process.

15 Claims, 12 Drawing Sheets

(51) Int. Cl.
*C02F 1/32* (2006.01)
*C02F 1/72* (2006.01)
*B01J 35/06* (2006.01)
*B01J 23/42* (2006.01)
*B01J 35/04* (2006.01)
*C02F 101/30* (2006.01)

(52) U.S. Cl.
CPC ......... *B01J 35/065* (2013.01); *B01J 37/0238* (2013.01); *B01J 37/0244* (2013.01); *C02F 1/32* (2013.01); *C02F 1/725* (2013.01); *B01J 35/006* (2013.01); *B01J 35/023* (2013.01); *C02F 2101/30* (2013.01); *C02F 2305/10* (2013.01)

(58) Field of Classification Search
CPC .............. C02F 2101/00; C02F 2101/30; C02F 2305/00; C02F 2305/10
See application file for complete search history.

(56) References Cited

U.S. PATENT DOCUMENTS

| | | | | |
|---|---|---|---|---|
| 2004/0149307 | A1* | 8/2004 | Hartig | C03C 17/34 134/1 |
| 2005/0153198 | A1* | 7/2005 | Suzuki | H01M 4/8605 429/128 |
| 2010/0187172 | A1* | 7/2010 | Paulose | B82Y 30/00 210/506 |
| 2011/0251051 | A1* | 10/2011 | Bai | E04D 7/005 502/150 |

OTHER PUBLICATIONS

Liang et al., Photocatalysis of Ag-loaded TiO2 Nanotube Arrays Formed by Atomic Layer Deposition, Apr. 27, 2011, The Journal of Physical Chemistry, 115(19), pp. 9498-9502.*

* cited by examiner

NANOPOROUS THIN FILM AND METHOD FOR FABRICATING THE SAME

This application claims the benefit of Taiwan Intellectual Property Office Application No. 103130805, filed on Sep. 5, 2014, in the State Intellectual Property Office, the disclosure of which is incorporated herein its entirety by reference.

FIELD

The present invention relates to a nanoporous thin film and a method for fabricating the same, in particular to a nanoporous thin film having a composite structure of laminated photocatalyst layer and a method for fabricating the same, wherein the composite structure of laminated photocatalyst layer includes a metal-based photocatalyst layer formed on a oxide-based photocatalyst layer.

BACKGROUND

In chemistry, a photocatalyst generally refers to a catalyst substance capable of facilitating a chemical reaction by receiving a light and a photocatalyst reaction generally refers to a catalytic reaction caused by an absorption of light. In the technical field of the conventional photocatalyst or photocatalysis, the frequently-used photocatalyst materials include such as a titanium dioxide ($TiO_2$), an zinc oxide (ZnO), a tin dioxide ($SnO_2$), a cadmium oxide (CdO), a chromium oxide ($CrO_2$), a cadmium sulfide (CdS) and an zinc sulfide (ZnS) etc. The titanium dioxide is the most widely-used one among these materials to act as a photocatalyst medium, because of its good chemical stability, non-toxic feature and cheap price. In particular, the nanolized titanium dioxide is able to provide better ability of oxidation, specific surface and activity of photocatalysis.

In the state of the art, the traditional way to utilize the photocatalyst is often to coat the photocatalyst in the powder state onto a surface of the substrate as a thin layer of photocatalyst by using a chemical deposition scheme. The most frequently-used chemical deposition scheme includes an atomic layer deposition (ALD) scheme, a chemical vapor deposition (CVD) scheme, a plasma-enhanced chemical vapor deposition (PECVD) scheme etc., in which the ALD scheme is widely applicable to the technical field requiring growing a thin film, such as a ultra thin dielectric layer, a diffusion barrier layer, a seed layer, a sidewall, a sidewall oxide or a sidewall spacer etc., in such as a semiconductor component.

The ALD scheme is a well-known deposition technique and it employs a precursor material which can react with or chemisorb on a surface in process to build up successively deposited layers, each of which layers being characterized with thickness about only one atomic layer. Subject to properly selected process conditions, the chemisorption reaction has a self-limiting characteristic, meaning that the amount of precursor material deposited in every reaction cycle is constant and the precursor material is restricted to growing on the surface, and therefore the film thickness can be easily and precisely controlled by the number of the applied growth cycles.

Conventionally, a batch of ALD scheme usually consists of multiple ALD reaction cycles, each of which ALD reaction cycles involves consequently performing steps of introducing a first gaseous precursor pulse to a surface in process, pulsing an inert gas to purge or evacuate the excess gaseous precursor after the surface is saturated with an atomic layer of the first gaseous precursor, pulsing a second gaseous precursor and purging by an inert gas pulse or evacuating. A single ALD reaction cycle is continuously repeated until a target thickness for the deposited atomic layer on the surface in process is achieved.

It is to be noticed that in the technical field of the conventional photocatalyst, it is used to just form a single first layer of photocatalyst on the substrate. Actually, it is worth a try to further form an additional layer of photocatalyst on the first layer, which photocatalyst is a different type of photocatalyst to that of forming the first layer. It might be possible to enhance the entire reaction efficient by such a dual layer structure of photocatalyst.

There is a need to solve the above deficiencies/issues.

SUMMARY

The present invention provides an application program establishing platform. The application program establishing platform, which is configured to be implementable on a computer to provide a user with a user interface for establishing an application program based on a user-defined logical determining criterion and implementable on a mobile device, includes a managing module. The managing module is configured to provide the user to set the user-defined logical determining criterion, wherein the user-defined logical determining criterion is based on an if-this-than-that rule, and to compile the application program into a format implementable on the mobile device.

The present invention provides a nanoporous thin film fabricating method. The method used for fabricating a nanoporous thin film with a composite photocatalyst structure for a photodegradation and a water purification, includes steps of providing a porous substrate with a plurality of through-nanopores therein, each of which through-nanopores have an inner tube wall; forming an oxide-based photocatalyst layer over the porous substrate and the inner tube wall by using a first chemical-based deposition process; and forming a metal-based photocatalyst layer on a part of the oxide-based photocatalyst layer by using a second chemical-based deposition process.

The present invention further provides a nanoporous thin film. The nanoporous thin film having a composite photocatalyst structure for a photodegradation and a water purification and manufactured by using a chemical-based deposition process, includes a porous substrate with an array of through-nanopores therein, each of which through-nanopores have an inner tube wall; an oxide-based photocatalyst layer formed over the porous substrate and the inner tube wall by the chemical-based deposition process; and a metal-based photocatalyst layer formed on a part of the oxide-based photocatalyst layer by the same chemical-based deposition process.

The present invention further provides a nanoporous thin film. The nanoporous thin film acts as a nanoreactor and is applied to a nanoreactor unit. The nanoreactor unit includes a first base having a first conduit for guiding a reactant fluid flowing therethrough; a second base having a second conduit for guiding the reactant fluid flowing therethrough, wherein one of the first and second bases is made of a light transmissible material; and the nanoporous thin film acting as the nanoreactor sandwiched between the first base and the second base, wherein the reactant fluid flows through the nanoreactor unit via the first conduit, the nanoporous thin film and the second conduit.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1C:
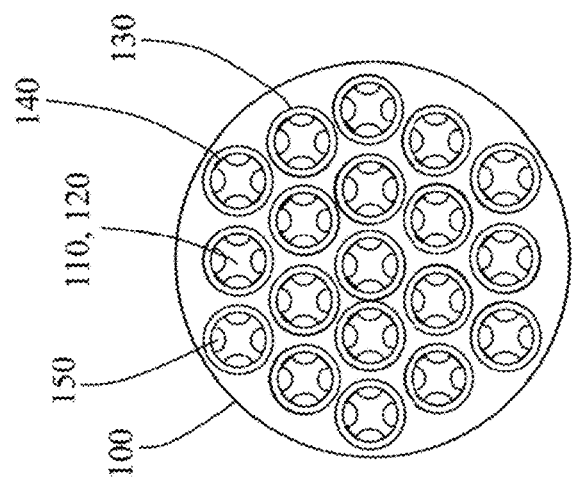
FIG. 1(c) shows a top-view cross-section schematic diagram illustrating a cross-section profile for the as-formed composite photocatalyst structure, including the Pt nanoparticle layer on the TiO$_2$ layer on the template substrate in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

A through-nanopore described in the present disclosure is also referred to as a through-nanohole, a through-nanotube or a via, penetrating a substrate and connecting spaces at both sides of the substrate.

A template substrate or membrane material, such as an anodic aluminum oxide (AAO) material, a porous anodic aluminum (PAA) material, a porous substrate material with an array of multiple open through-nanopores formed therein, a porous membrane material with multiple open through-nanopores formed therein and the like acting as a template substrate is first prepared and provided. Each of the open through-nanopores preferably is formed with a nanotube that is made to penetrate the substrate or the membrane. Each of the nanotube has an inner tube wall within the tube body and allows a reactant fluid to flow therethrough, whereby the reactant fluid flows through the substrate or the membrane. The nanotube preferably has a tube diameter in a range between 11 nm~200 nm and a tube length in a range between 0.001 cm~10 cm. In this embodiment, an AAO substrate is preferably selected to act as the template substrate, but the template substrate is not limited to the AAO substrate.

Next, a first chemical-based deposition process, such as an atomic layer deposition (ALD) process, a chemical vapor deposition (CVD) process and a plasma-enhanced chemical vapor deposition (PECVD) process and the like, is applied, so as to form a thin layer of an oxide-based photocatalyst, including such as a TiO$_2$ substance, a ZnO substance, a SnO$_2$ substance and a substance having a general molecular formula TiO$_X$N$_{2-X}$ and the like, over the entire surface exposed on the template substrate, which exposed surface includes the visible surface on the substrate and the surface on the inner tube wall in the nanotube at least.

In this embodiment, the first chemical-based deposition process is preferably the ALD process for depositing the thin layer of the oxide-based photocatalyst, preferably the TiO$_2$ photocatalyst layer, all over the entire surface exposed on the template substrate. In particular, a horizontal flow-type ALD is carried out to perform the deposition of the TiO$_2$ photocatalyst layer, in which TiCl$_4$ and H$_2$O in vapor state are alternatively used as precursors. The template substrate is placed in an environment with a temperature around 100° C. and a working pressure around 2 mTorr. The purge periods of TiCl$_4$ and H$_2$O are respectively set to 0.4 second and 0.2 second, in which a 5-second period of N$_2$ gas purge is used to separate each precursor pulses. The growth-per-cycle (GPC) of TiO$_2$ is approximately 0.58 Å per cycle. As the number of the ALD cycle increases, the tube diameter of TiO$_2$ nanotubes decreases. The excessive TiO$_2$ overlayer on the template substrate is removed optionally by using a mechanical polishing scheme with colloidal SiO$_2$ solution or a chemical mechanical polishing scheme.

Accordingly, a TiO$_2$ photocatalyst layer is now deposited over the template substrate and multiple TiO$_2$ nanotubes are now formed in the template substrate, so that a TiO$_2$-based porous membrane is formed. The as-made structure is referred to as TiO$_2$@AAO for short hereinafter. The tube diameter of TiO$_2$ nanotube can be controlled by the thickness of TiO$_2$ coating or simply the number of the ALD cycle.

For a 400-cycle ALD process, a $TiO_2$ layer having a thickness around 22 nm is coated onto the template substrate, and the tube diameter of the $TiO_2$ nanotube is approximately 101 nm.

In subsequent, after the deposition of $TiO_2$ onto the porous template substrate, a second chemical-based deposition process, such as an atomic layer deposition (ALD) process, a chemical vapor deposition (CVD) process and a plasma-enhanced chemical vapor deposition (PECVD) process and the like, is applied to form a successive thin layer of an metal-based photocatalyst, such as a Pt photocatalyst layer, an Au photocatalyst layer, a Cu photocatalyst layer and a Ni photocatalyst layer and the like, on a part of the surface on the oxide-based photocatalyst layer.

In this embodiment, multiple Pt nanoparticles (NPs) acting as the metal-based photocatalyst layer are then deposited onto the as-formed $TiO_2$ layer preferably by a vertical flow-type ALD, so as to produce a metal-based photocatalyst layer on a part of the $TiO_2$ layer. Due to the self-limiting growth feature of the ALD process, the Pt NPs layer can be uniformly distributed over the $TiO_2$ layer thereunderneath. A $MeCpPtMe_3$ compound and an oxygen gas are used as precursors for the deposition of Pt NPs layer. In each cycle, the $MeCpPtMe_3$ pulse lasts for 1 second and the $O_2$ pulse lasts for 5 seconds are separated by a 20-second period of $N_2$ purge.

Preferably, the Pt NPs deposition is carried out for 50 cycles at 350° C. Then, the as-formed composite photocatalyst structure, including the Pt nanoparticle layer on the $TiO_2$ layer, on the template substrate is to be annealed at 450° C. lasting for 2 hours to make sure the conversion of $TiO_2$ to transform into the anatase phase. The as-made structure is optionally referred to as $Pt@TiO_2@AAO$ for short hereinafter. Finally, if needed, the AAO template membrane is removed depending upon the actual demands by immersing the entire sample into a NaOH solution, to finally form a composite photocatalyst structure, which remains the Pt nanoparticle layer on the $TiO_2$ layer and the $TiO_2$ layer. The as-made structure is optionally referred to as $Pt@TiO_2$ for short hereinafter.

Figure 1B:
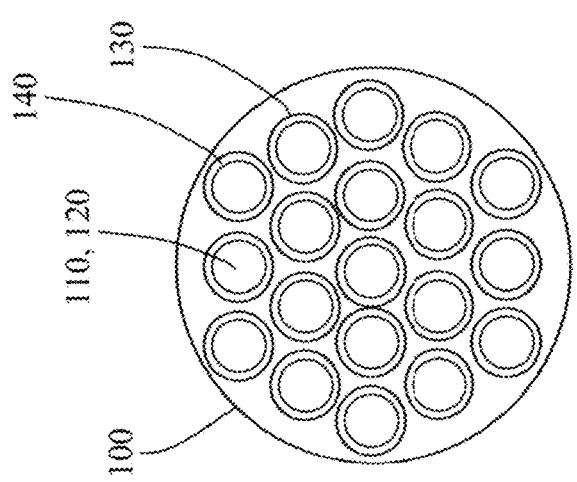
FIG. 1(b) shows a top-view cross-section schematic diagram illustrating a cross-section profile for the as-formed TiO$_2$ photocatalyst layer over the template substrate in accordance with the present invention.
Figure 1A:
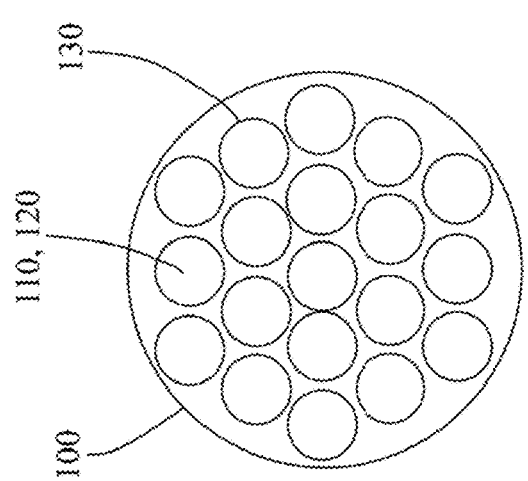
FIG. 1(a) shows a top-view cross-section schematic diagram illustrating a cross-section profile for the porous template substrate in accordance with the present invention.
Figure 1D:
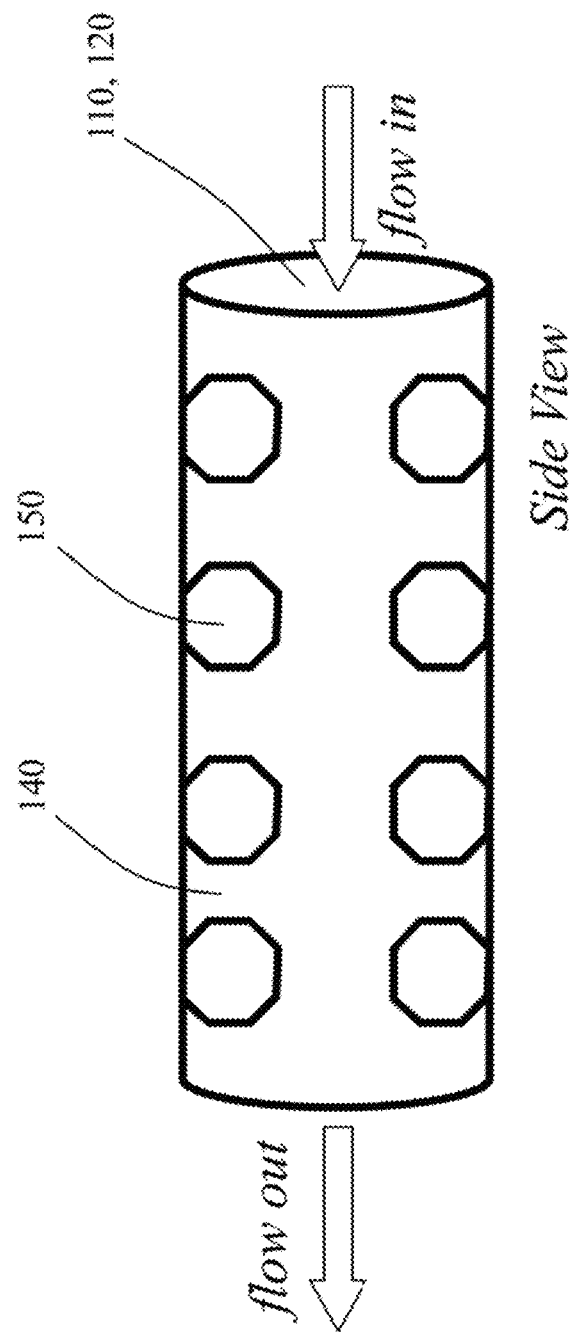
FIG. 1(d) shows a perspective side-view schematic diagram illustrating the composite photocatalyst structure in accordance with the present invention.

FIGS. 1(a)~1(c) show multiple top-view (front-view) cross-section schematic diagrams illustrating a series of cross-section profile variations for the composite photocatalyst structure on the template substrate from a top view in different stages in the fabricating method in accordance with the present invention. FIG. 1(a) shows a top-view cross-section schematic diagram illustrating a cross-section profile for the porous template substrate in accordance with the present invention. FIG. 1(b) shows a top-view cross-section schematic diagram illustrating a cross-section profile for the as-formed $TiO_2$ photocatalyst layer over the template substrate in accordance with the present invention. FIG. 1(c) shows a top-view cross-section schematic diagram illustrating a cross-section profile for the as-formed composite photocatalyst structure, including the Pt nanoparticle layer on the $TiO_2$ layer on the template substrate in accordance with the present invention. FIG. 1(d) shows a perspective side-view schematic diagram illustrating the composite photocatalyst structure in accordance with the present invention.

In FIG. 1(a), an AAO membrane 100 including multiple open through-nanopores 110 is used as a template substrate for carrying and supporting the composite photocatalyst structure thereon. Each of the open through-nanopores 110 is formed with a nanotube 120 that is made to penetrate the AAO membrane 100. The nanotube 120 has an inner tube wall 130 within the tube body and allows a reactant fluid to flow therethrough, whereby the reactant fluid flows through the AAO membrane 100. In FIG. 1(b), a $TiO_2$ photocatalyst layer 140 is coated over the entire exposed surface on the AAO membrane 100 by a horizontal flow-type ALD process, which exposed surface includes the surface on the AAO membrane 100 itself and the surface on the inner tube wall 130 in the nanotube 120 at least. In FIG. 1(c), a Pt NPs photocatalyst layer 150 is successively formed by performing a vertical flow-type ALD process and formed partially over a part of the $TiO_2$ photocatalyst layer 140 on the AAO membrane 100. The composite photocatalyst structure includes the $TiO_2$ photocatalyst layer 140 and the Pt NPs photocatalyst layer 150, which are as an oxide-based photocatalyst layer and as a metal-based photocatalyst layer respectively. In FIG. 1(d), it shows that the Pt nanoparticles 150 are uniformly distributed over the partially $TiO_2$ photocatalyst layer 140 thereunderneath and a reactant fluid can flow through the open through-nanopore 110 a.k.a. the nanotube 120.

Figure 2A:
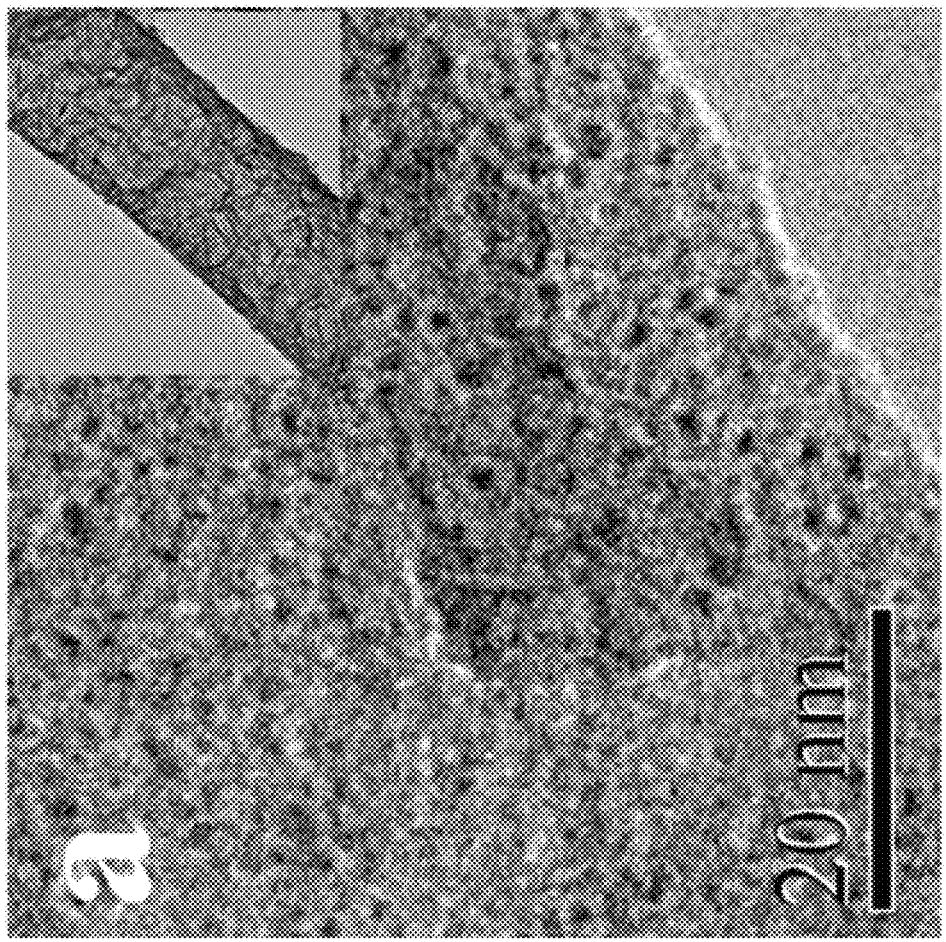
FIG. 2(a) shows an image illustrating a representative transmission electron microscopic (TEM) image for the composite photocatalyst structure in accordance with the present invention.

In order to further analyze characters of the composite photocatalyst structure carried on and supported by the template substrate, the template substrate, for example the AAO membrane, is removed by immersing the entire sample into a NaOH solution. FIG. 2(a) shows an image illustrating a representative transmission electron microscopic (TEM) image for the composite photocatalyst structure in accordance with the present invention. The composite photocatalyst structure (a $Pt@TiO_2$) shown in FIG. 2(a) includes a $TiO_2$ tube (400 cycles of ALD) deposited with Pt NPs (50 cycles of ALD) which is growth from a porous AAO template membrane after removing the base part of the AAO membrane. The inset at upper-right in FIG. 2(a) shows a low-resolution magnified TEM image. The $TiO_2$ tube contains numerous Pt NPs with the diameter of 1 nm~5 nm on the surface of the $TiO_2$ is coated on the inner tube wall. The Pt grown by ALD with a few cycles normally forms small nanoparticles before continuous Pt film forms when (methylcyclopentadienyl)trimethylplatinum (namely $MeCpPtMe_3$) and $O_2$ are employed as precursors.

Figure 2B:
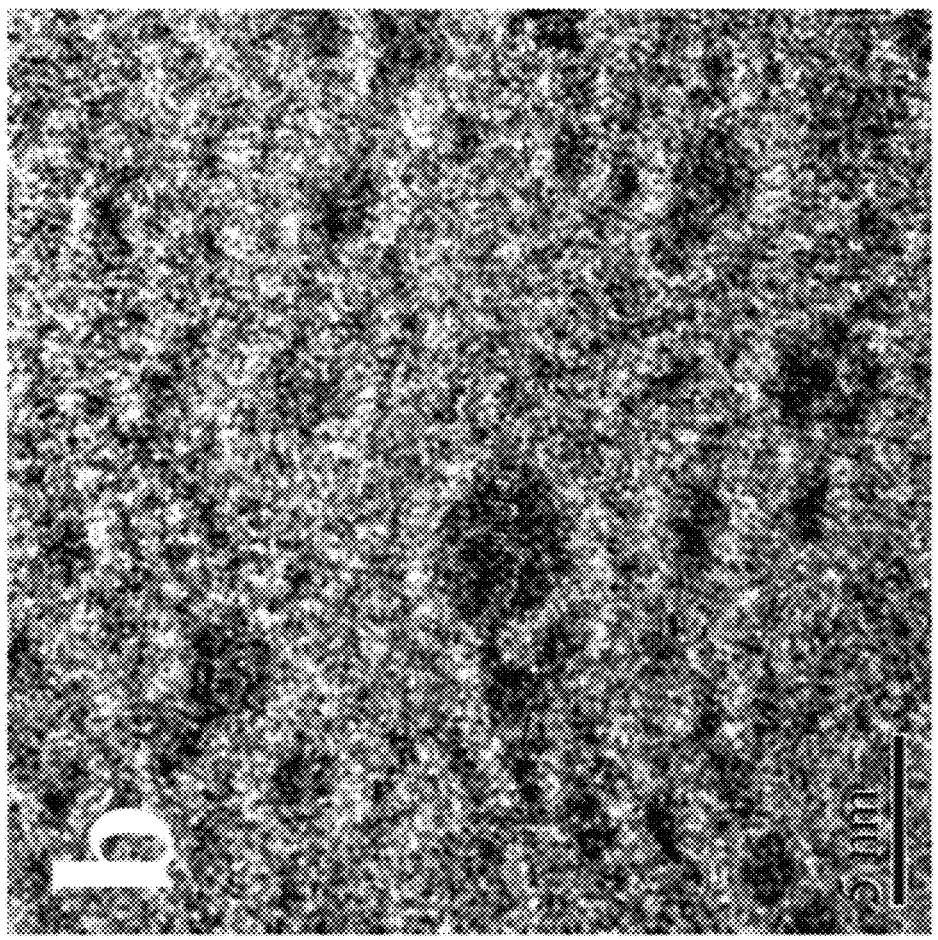
FIG. 2(b) shows a TEM image illustrating the Pt NPs on TiO$_2$, which is annealed at 450° C. lasting for 2 hours.
Figure 2C:
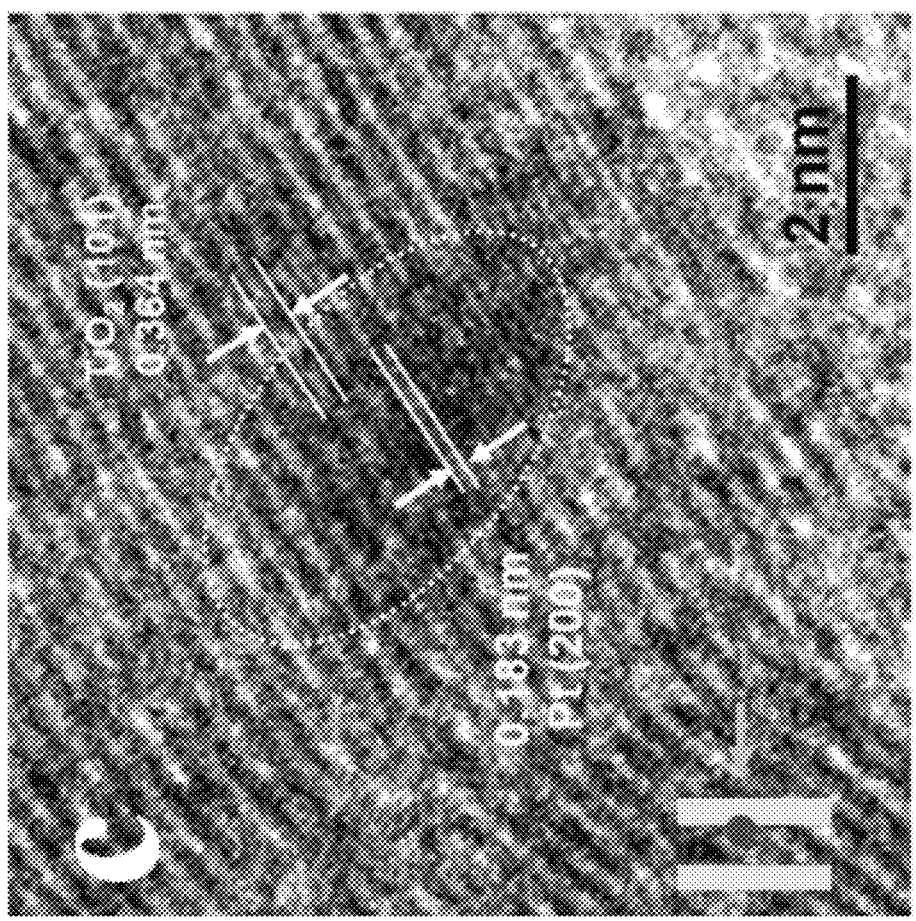
FIG. 2(c) shows a high-resolution TEM image illustrating the Pt NPs on TiO$_2$.
Figure 3:
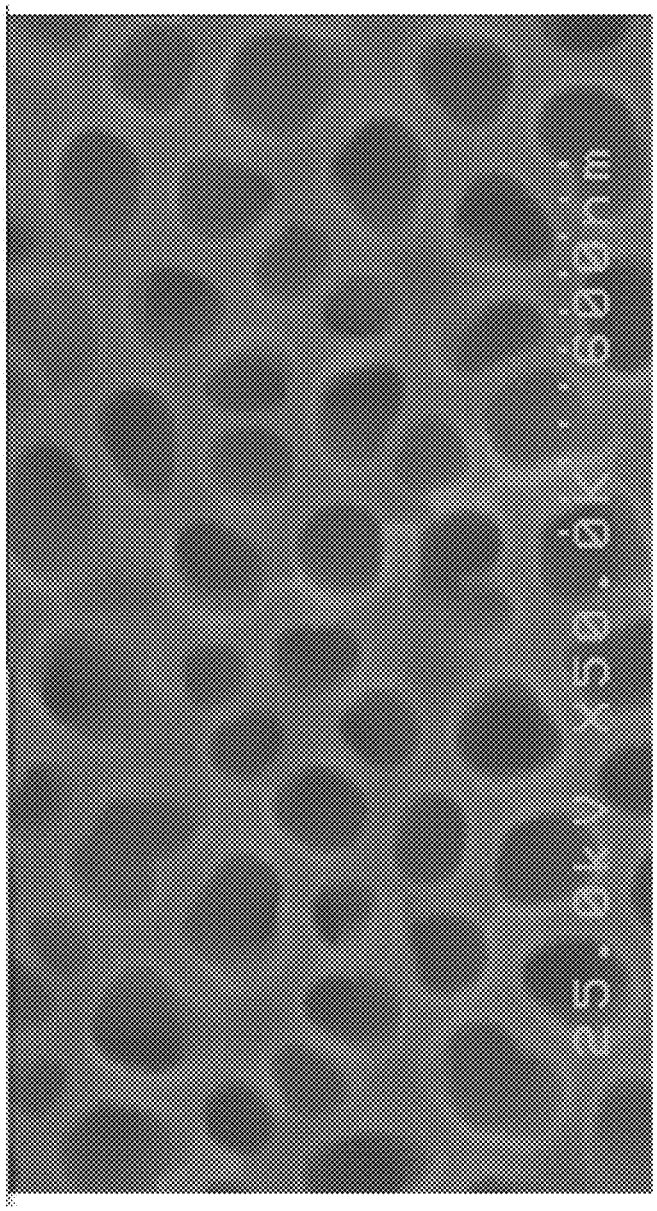
FIG. 3 shows a TEM image illustrating the nanoporous thin film in accordance with the present invention.

FIG. 2(b) shows a TEM image illustrating the Pt NPs on $TiO_2$ which is annealed at 450° C. lasting for 2 hours. It is to be noticed that the Pt NPs are deposited on the inner tube wall of the $TiO_2$ tube, so images of the Pt NPs shown in FIG. 2(b) are slightly blurred. FIG. 2(c) shows a high-resolution TEM image illustrating the Pt NPs on $TiO_2$. The lattice fringes indicate that both Pt and $TiO_2$ have good crystallinity. The interplanar spacings of Pt NP and $TiO_2$ at the Pt—$TiO_2$ interface are measured to be around 0.183 nm and 0.364 nm respectively. It is to be further noticed that, although the interplanar between Pt NP and $TiO_2$ is a kind of heterojunction, it is observed a strong adhesion occurring on the interplanar. It reasonably presumes that there is an epitaxial crystallization grown on the interplanar. FIG. 3 shows a TEM image illustrating the nanoporous thin film in accordance with the present invention. An array consisting of multiple porous structures can be clearly indentified in FIG. 3.

Figure 4:
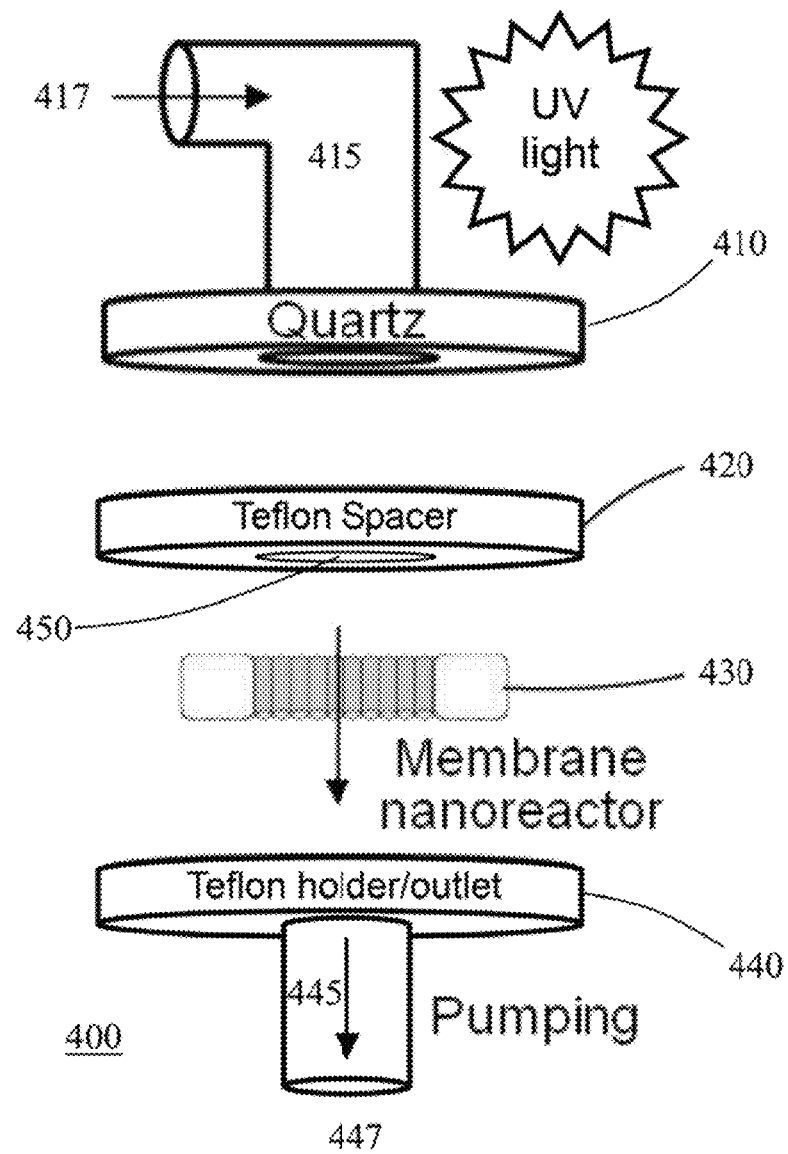
FIG. 4 shows a schematic diagram illustrating a structure for the nanoreactor unit utilizing the composite photocatalyst structure in accordance with the present invention.

Based on the as-made composite photocatalyst structure in accordance with the present invention, the composite photocatalyst structure is capable of being applied to be used as a nanoreactor core in a nanoreactor unit. FIG. 4 shows a schematic diagram illustrating a structure for the nanoreactor unit utilizing the composite photocatalyst structure in accordance with the present invention. The nanoreactor unit 400 in FIG. 4 includes a first holder 410, a second holder 440, a spacer sheet 420 and a composite photocatalyst structure film behaving as a nanoreactor 430 or equivalently a filtering core. The nanoreactor 430 is placed on the spacer sheet 420 and the nanoreactor 430 and the spacer sheet 420 are sandwiched between the first holder 410 and the second holder 440. The first holder 410 and the second holder 440 are secured together by an adequate fasten means, such as a screwing means, whereby the nanoreactor 430 and the spacer sheet 420 can be sandwiched therebetween.

Preferably, one of the first holder 410 and the second holder 440 is made of a quartz material or a light transmissible material, in order to allow the sun light or ultraviolet (UV) light passing therethrough to illuminate the nanoreactor 430 to activate the photocatalysis reaction, so as to enable a photodegradation process and a water purification process for the reactant fluid passing through the nanoreactor 430. One of the first holder 410 and the second holder 440 is preferably made of a Telfon material which includes polytetrafluoroethene (PTFE) and the spacer sheet 420 is preferably made of a Telfon material as well.

Both the first holder 410 and the second holder 440 include a first conduit 415 and a second conduit 445 which guides the reactant fluid to flow into and through the nanoreactor 430. There is an open hole 450 disposed in the center of the spacer sheet 420 where the nanoreactor 430 is exactly situated, in order to render the reactant fluid can flow through the nanoreactor 430. The reactant fluid can flow through the nanoreactor 400 in a way of the first conduit 415, the open hole 450, the nanoreactor 430 and the second conduit 445, or vice versa (a way of the second conduit 445, the nanoreactor 430, the open hole 450 and the first conduit 415). The nanoreactor 430 is wrapped with a plastic tape along the edge, placed and situated corresponding to the open hole 450 on the spacer sheet 420 and sandwiched and fixed between the first and second holders 410 and 440.

The first and second holders 410 and 440 have the respective open ends acting as an inlet end 417 and an outlet end 447 respectively for the reactant fluid. The inlet end 417 is connected to a reservoir for storing the reactant fluid and the outlet end 447 is connected to a dry pump for providing the suction force to the reactant fluid so as to drive it to move and flow through the nanoreactor 430. The nanoreactor 430 consists of multiple Pt-loaded $TiO_2$ nanotubes which act as a tubular reactor that provides a nano-spaced channel. It is estimated that the nanoreactor 430 provides at least $4.08 \times 10^8$ tubes distributed in the illuminated area, which is very dense and intense. Therefore, the total tube volume in the illuminated area is approximately $1.63 \times 10^{-4}$ ml.

Figure 5:
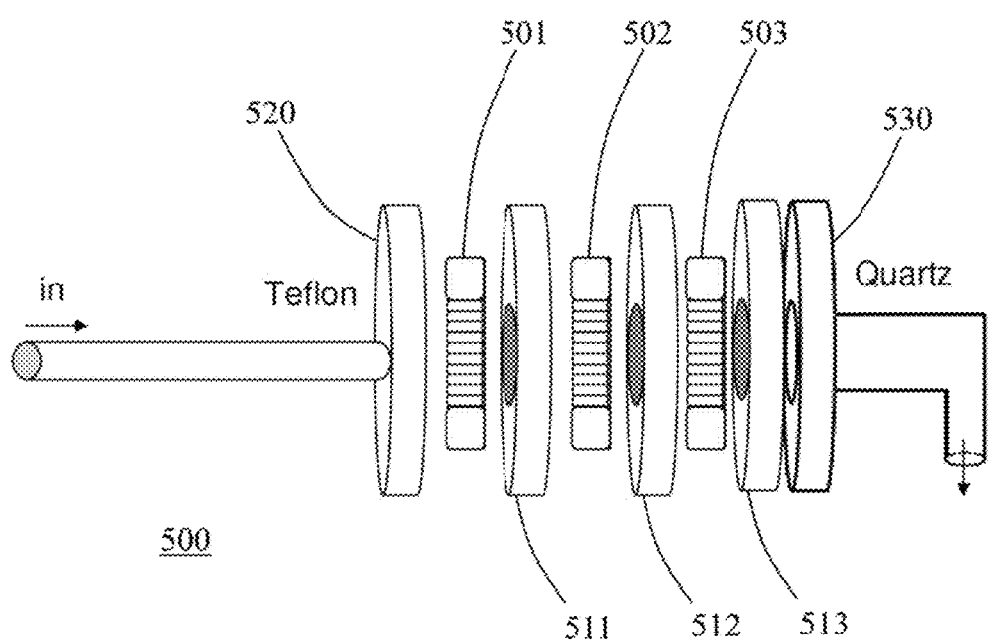
FIG. 5 shows a schematic diagram illustrating a serial configuration for multiple nanoreactors in accordance with the present invention.
Figure 6:
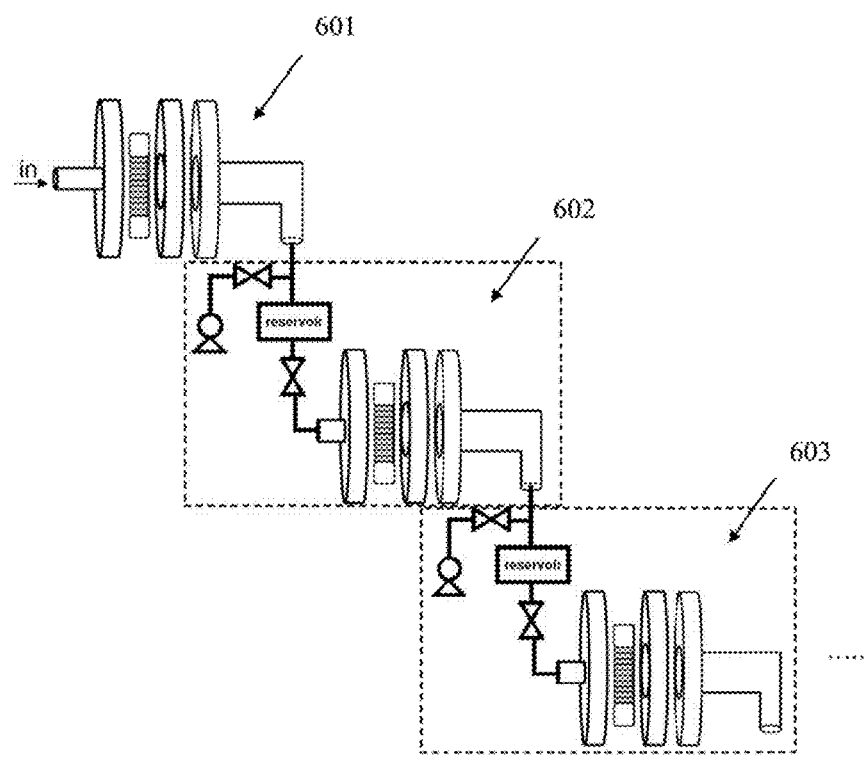
FIG. 6 shows a schematic diagram illustrating a serial configuration for multiple nanoreactor units in accordance with the present invention.
Figure 7:
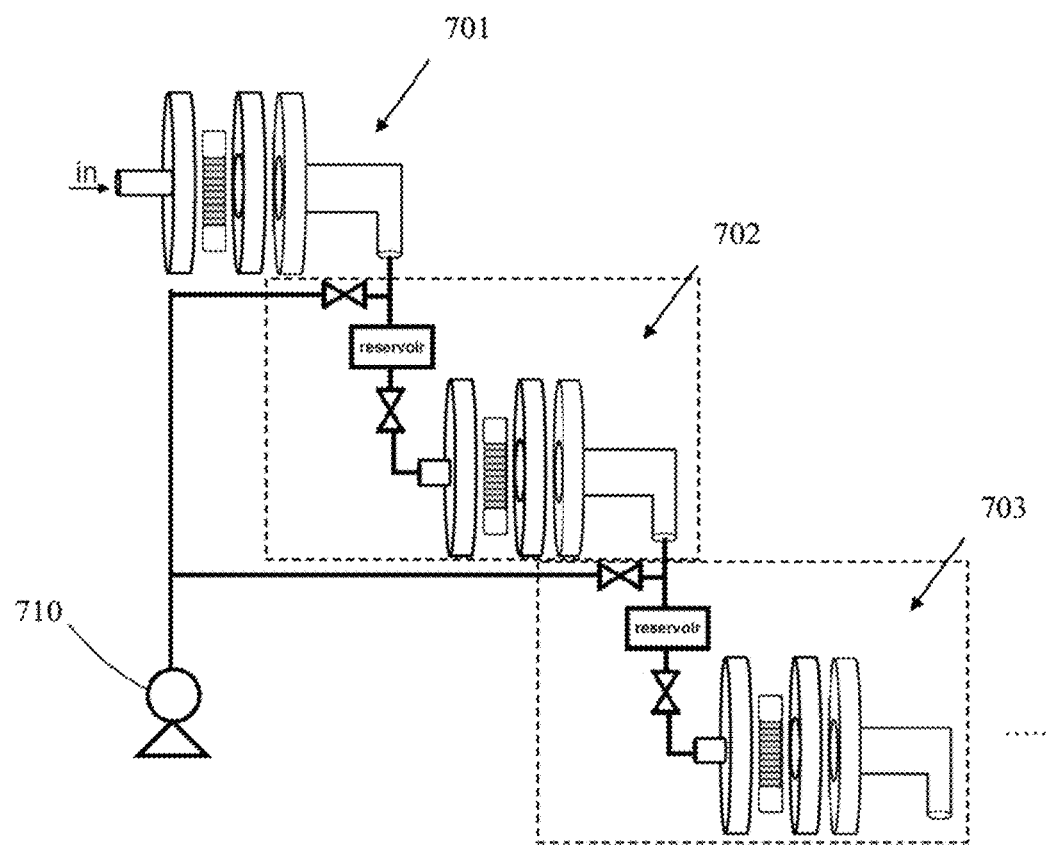
FIG. 7 shows a schematic diagram illustrating a serial configuration for multiple nanoreactor units using the same power source in common in accordance with the present invention.

The above-mentioned multiple nanoreactor and nanoreactor unit thereof can be combined, arranged, rearranged and connected with each other or one another in various possible configurations to form a nanoreactor system. For example, multiple nanoreactors or nanoreactor units can be arranged and connected in a parallel configuration, in a serial configuration, in a hybrid configuration of the parallel and serial configurations or in an array configuration, which configurations and arraignments can effectively increase the overall performance for the whole system. In particular the serial configuration or arraignment can significantly increase the overall performance for the whole system in an actual application. FIGS. 5~7 show the schematic diagrams illustrating several examples for the serial configuration. FIG. 5 shows a schematic diagram illustrating a serial configuration for multiple nanoreactors in accordance with the present invention. FIG. 6 shows a schematic diagram illustrating a serial configuration for multiple nanoreactor units in accordance with the present invention. FIG. 7 shows a schematic diagram illustrating a serial configuration for multiple nanoreactor units using the same power source in common in accordance with the present invention.

Figure 8:
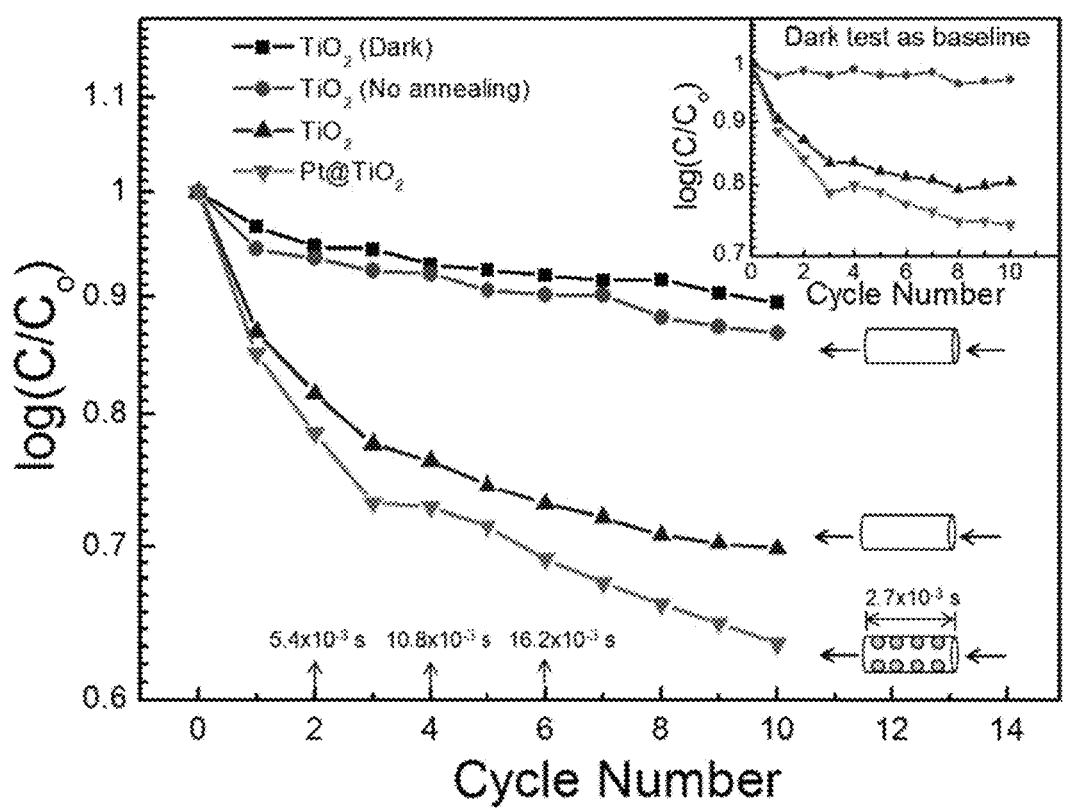
FIG. 8 shows a semi-log graph illustrating a semi-log dimensionless concentration percentage with respect to a cycle number for four sets of experiments.

In FIG. 5, the nanoreactor unit 500 includes multiple nanoreactors 501, 502 and 503 which are serially arranged, held by the spacer sheets 511, 512 and 513 and sandwiched between the first holder 520 and the second holder 530, wherein the second holder 530 are made of a quartz material in this embodiment in order to receive/accept sun light or UV light. In FIG. 6, multiple nanoreactor units 601, 602 and 603 are arranged and connected with one another in series. In FIG. 7, multiple nanoreactor units 701, 702 and 703 are still arranged and connected with one another in series; however, both nanoreactor units 701 and 702 use the same dry pump 710 in common FIG. 8 shows a semi-log graph illustrating a semi-log dimensionless concentration percentage with respect to a cycle number for four sets of experiments. There are four kinds of experiment is carried out and labeled as $TiO_2$ (Dark), $TiO_2$ (No annealing), $TiO_2$ and Pt@$TiO_2$ respectively in FIG. 8. In order to further analyze the photocatalysis performance for the nanoreactor, a blank experiment in the dark is first conducted for reference. A methylene blue ($C_{16}H_{18}N_3SCl$, MB) is adopted as a test reagent. Then an adequate amount of 30 ml of $2 \times 10^{-6}$ M MB aqueous solution is forced to flow through and kept to be repeatedly circulated through the nanotubes/nanochannels in the nanoreactor by using a dry pump. The whole test is performed in the dark environment and lasts for 20 min for reference. Each flowthrough cycle is defined as a complete process of MB solution flowing through the nanoreactor with the mean flow rate around 0.06 ml/second for 30 ml of MB. The reaction temperature is kept at 24° C. As for the comparison, a black-light UV-A lamp equipped with a filter (Black-Ray B-100, λ=365 nm) is then used as the light source. The variation of MB concentration was measured by UV-vis spectroscopy.

In the nanoreactor, the mean flow rate of MB solution was around 0.06 ml/second. Since the length and tube diameter of a $TiO_2$ nanotube are around 50 mm and around 101 nm, respectively, the volume inside a $TiO_2$ nanotube is calculated to be $4.0 \times 10^{-13}$ cm$^3$. The area of the nanoreactor exposed to UV light is estimated to be around $1.57 \times 10^{-5}$ m$^2$, which contains around $4.08 \times 10^8$ nanotubes with a total volume of $1.63 \times 10^{-4}$ cm$^3$. Thus, the actual traveling time of MB molecules through the $TiO_2$ nanochannels in the nanoreactor is estimated to be around $2.7 \times 10^{-3}$ second in each cycle. For the annealed $TiO_2$@AAO membrane nanoreactor, the photodegradation efficiency is significantly improved because of the higher photocatalytic performance of anatase $TiO_2$. The Schottky barrier could reduce the electron-hole recombination and enhance electron-hole separation, thus enhancing the photocatalysis.

It was noted from the dark test that some MB molecules were adsorbed on the $TiO_2$ membrane. A similar result was reported in a recent study, where a $TiO_2$-coated AAO membrane filter was demonstrated to efficiently adsorb toluene molecules. In the present study, this phenomenon gradually reduced the flow rate of MB aqueous solution through the membrane nanoreactor in the dark test. In order to eliminate the effect of adsorption of MB on the nanoreactor, the photodegradation curves are calibrated by using the dark reference curve as the baseline, as shown in the inset in FIG. 8. After the calibration, the photodecomposition of MB in the unannealed $TiO_2$@AAO nanoreactor displays a small level-off decay against the cycle number. The annealed $TiO_2$@AAO and Pt@$TiO_2$@AAO nanoreactor curves, on the other hand, exhibit continuous decays. The overall decays after ten cycles are 3.2%, 20.3%, and 27.7% for as-prepared $TiO_2$@AAO, annealed $TiO_2$@AAO, and annealed Pt@TiO$_2$@AAO nanoreactors, respectively, which mean that more than ¼ MB can be photodegraded in about 2.7×10$^{-2}$ second (actual contact time with TiO$_2$ in ten cycles) by the annealed Pt@TiO$_2$@AAO nanoreactor. Note that the illuminated region of the membrane nanoreactor is only 1.57×10$^{-5}$ m$^2$ in this case. The high photodegradation rate of MB could be ascribed to the space confinement effect that improves the mass transfer of MB to the TiO$_2$ surface in the nanoreactor which is to be discussed later.

Figure 9:
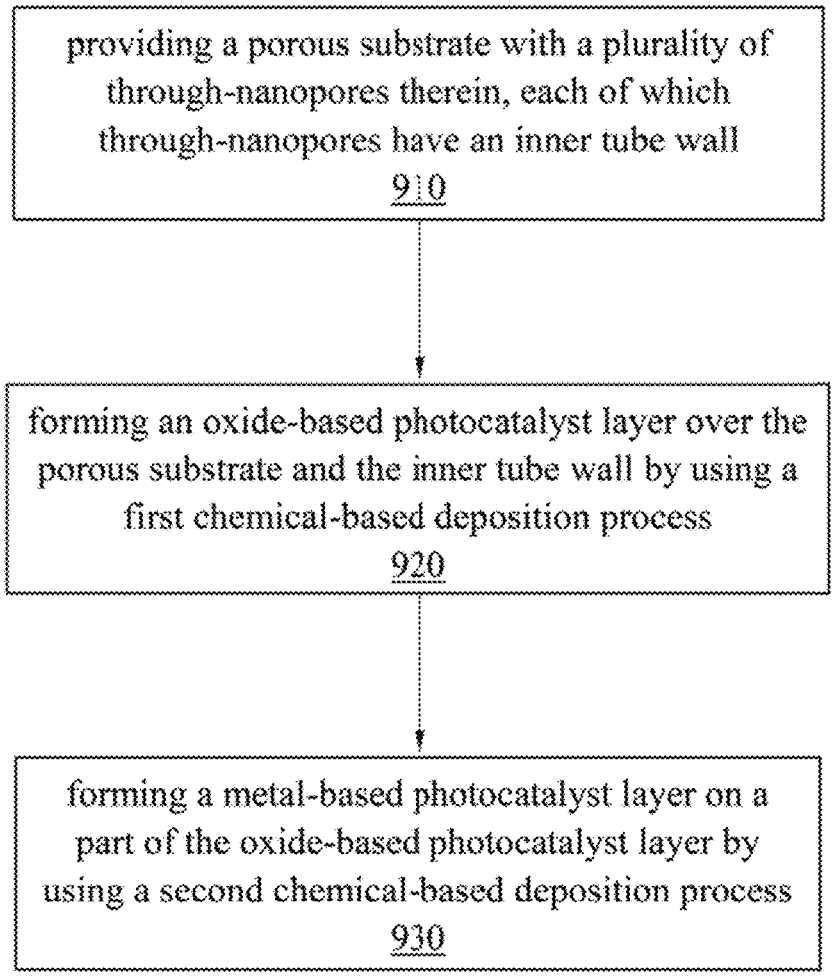
FIG. 9 shows a flow chart illustrating multiple steps included in the method for fabricating the nanoporous porous thin film in accordance with the present invention.

FIG. 9 shows a flow chart illustrating multiple steps included in the method for fabricating the nanoporous porous thin film in accordance with the present invention. The method is used for fabricating a nanoporous thin film with a composite photocatalyst structure used in a photodegradation and a water purification. The method includes steps of step 910: providing a porous substrate with a plurality of through-nanopores therein, each of which through-nanopores have an inner tube wall; step 920: forming an oxide-based photocatalyst layer over the porous substrate and the inner tube wall by using a first chemical-based deposition process; and step 930: forming a metal-based photocatalyst layer on a part of the oxide-based photocatalyst layer by using a second chemical-based deposition process.

There are further embodiments provided as follows.

Embodiment 1: a nanoporous thin film fabricating method for fabricating a nanoporous thin film with a composite photocatalyst structure for a photodegradation and a water purification, including providing a porous substrate with a plurality of through-nanopores therein, each of which through-nanopores have an inner tube wall; forming an oxide-based photocatalyst layer over the porous substrate and the inner tube wall by using a first chemical-based deposition process; and forming a metal-based photocatalyst layer on a part of the oxide-based photocatalyst layer by using a second chemical-based deposition process.

Embodiment 2: the method according to Embodiment 1 further including removing an excessive overlay of the oxide-based photocatalyst layer by using one of a mechanical polishing scheme and a chemical mechanical polishing scheme.

Embodiment 3: the method according to Embodiment 1, the first chemical-based deposition process is one selected from a group consisting of an atomic layer deposition (ALD) process, a chemical vapor deposition (CVD) process, a plasma-enhanced chemical vapor deposition (PECVD) process and a combination thereof and the second chemical-based deposition process is one selected from a group consisting of an atomic layer deposition (ALD) process, a chemical vapor deposition (CVD) process, a plasma-enhanced chemical vapor deposition (PECVD) process and a combination thereof.

Embodiment 4: the method according to Embodiment 3, the first chemical-based deposition process and the second chemical-based deposition process are the same chemical-based deposition process and the first chemical-based deposition process and the second chemical-based deposition process are the ALD process.

Embodiment 5: the method according to Embodiment 1, the oxide-based photocatalyst layer includes one selected from a group consisting of a TiO$_2$, a ZnO, a SnO$_2$, a TiO$_X$N$_{2-X}$ and a combination thereof.

Embodiment 6: the method according to Embodiment 1, the metal-based photocatalyst layer includes one selected from a group consisting of a Pt, an Au, a Cu, a Ni and a combination thereof.

Embodiment 7: a nanoporous thin film having a composite photocatalyst structure for a photodegradation and a water purification and manufactured by using a chemical-based deposition process, including a porous substrate with an array of through-nanopores therein, each of which through-nanopores have an inner tube wall; an oxide-based photocatalyst layer formed over the porous substrate and the inner tube wall by the chemical-based deposition process; and a metal-based photocatalyst layer formed on a part of the oxide-based photocatalyst layer by the same chemical-based deposition process.

Embodiment 8: the nanoporous thin film according to Embodiment 7, the composite photocatalyst structure includes the oxide-based photocatalyst layer and the metal-based photocatalyst layer.

Embodiment 9: the nanoporous thin film according to Embodiment 7, the metal-based photocatalyst layer includes a plurality of metal photocatalyst particles, each of which particles have a particle diameter in a range between 0.5 nm~100 nm.

Embodiment 10: the nanoporous thin film according to Embodiment 7, each of the through-nanopores have a tube with the inner tube wall therein and the tube has a tube diameter in a range between 11 nm~200 nm and a tube length in a range between 0.001 cm~10 cm.

Embodiment 11: the nanoporous thin film according to Embodiment 7 being acting as a nanoreactor and applied to a nanoreactor unit, wherein the nanoreactor unit includes a first base having a first conduit for guiding a reactant fluid flowing therethrough; a second base having a second conduit for guiding the reactant fluid flowing therethrough, wherein one of the first and second bases is made of a light transmissible material; and the nanoporous thin film acting as the nanoreactor sandwiched between the first base and the second base, wherein the reactant fluid flows through the nanoreactor unit via the first conduit, the nanoporous thin film and the second conduit.

Embodiment 12: the nanoporous thin film according to Embodiment 11, the nanoreactor unit further includes a spacer sheet having a center part and an open hole disposed at the center part, in which the nanoreactor is placed on the spacer sheet and situated correspondingly at the center part.

Embodiment 13: the nanoporous thin film according to Embodiment 11, there are multiple nanoreactor units arranged in a configuration selected from a group consisting of a serial configuration, a parallel configuration, a hybrid configuration of the serial and parallel configurations, an array configuration and a combination thereof.

Embodiment 14: the nanoporous thin film according to Embodiment 11, there are multiple nanoreactors arranged in a configuration selected from a group consisting of a serial configuration, a parallel configuration, a hybrid configuration of the serial and parallel configurations, an array configuration and a combination thereof.

Embodiment 15: the nanoporous thin film according to Embodiment 11, the nanoreactor unit is included in a nanoreactor system and the nanoreactor system includes a reservoir connected with the first conduit and used for storing the reactant fluid; and a pump connected with the second conduit and used for providing a suction force to the reactant fluid so as to drive it to flow through the nanoreactor.

Embodiment 16: the nanoporous thin film according to Embodiment 15, the nanoreactor system further includes the plurality of the nanoreactor units.

Embodiment 17: the nanoporous thin film according to Embodiment 11, the nanoreactor has an ability to photodegrade 27.7% of a contaminant off within 2.7×10$^{-2}$ second.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A nanoporous thin film fabricating method for fabricating a nanoporous thin film with a composite photocatalyst structure for a photodegradation and a water purification, comprising:
   providing a porous substrate with a plurality of through-nanopores therein, each of which through-nanopores have an inner tube wall;
   forming a metal-oxide-based photocatalyst layer consisting of one single sort of a metal oxide material over the porous substrate and the inner tube wall conformably by using a horizontal flow-type atomic layer deposition process;
   forming a metal-based photocatalyst layer consisting of one single sort of a metal material, which the metal material is one selected from a group consisting of a Pt, an Au, a Cu, and a Ni, partly on a part of the metal-oxide-based photocatalyst layer by using a vertical flow-type atomic layer deposition process; and
   transforming the metal-oxide-based photocatalyst layer into an anatase phase.

2. The method according to claim 1 further comprising:
   removing an excessive overlay of the metal-oxide-based photocatalyst layer by using one of a mechanical polishing scheme and a chemical mechanical polishing scheme; and
   transforming the metal-oxide-based photocatalyst layer into an anatase phase by an annealing scheme.

3. The method according to claim 1, wherein the first chemical-based deposition process is one selected from a group consisting of an atomic layer deposition (ALD) process, a chemical vapor deposition (CVD) process, a plasma-enhanced chemical vapor deposition (PECVD) process and a combination thereof and the second chemical-based deposition process is one selected from a group consisting of an atomic layer deposition (ALD) process, a chemical vapor deposition (CVD) process, a plasma-enhanced chemical vapor deposition (PECVD) process and a combination thereof.

4. The method according to claim 3, wherein the first chemical-based deposition process and the second chemical-based deposition process are the same chemical-based deposition process and the first chemical-based deposition process and the second chemical-based deposition process are the ALD process.

5. The method according to claim 1, wherein the metal oxide material is one selected from a group consisting of a $TiO_2$, a $ZnO$, a $SnO_2$, and a $TiO_xN_{2-x}$.

6. A nanoporous thin film having a composite photocatalyst structure for a photodegradation and a water purification and manufactured by using a chemical-based deposition process, comprising:
   a porous substrate with an array of through-nanopores therein, each of which through-nanopores have an inner tube wall;
   a metal-oxide-based photocatalyst layer consisting of one single sort of metal oxide material formed over the porous substrate and the inner tube wall conformably by a horizontal flow-type atomic layer deposition process, wherein the metal-oxide-based photocatalyst layer is in an anatase phase; and
   a metal-based photocatalyst layer consisting of one single sort of a metal material, which the metal material is one selected from a group consisting of a Pt, an Au, a Cu, and a Ni, formed on a part of the metal-oxide-based photocatalyst layer by a vertical flow-type atomic layer deposition process, wherein the nanoporous thin film acts as a nanoreactor and is applied to a nanoreactor unit, and the nanoreactor unit comprises:
      a first base having a first conduit for guiding a reactant fluid flowing therethrough;
      a second base having a second conduit for guiding the reactant fluid flowing therethrough, wherein one of the first and second bases is made of a light transmissible material; and
      the nanoporous thin film acting as the nanoreactor sandwiched between the first base and the second base, wherein the reactant fluid flows through the nanoreactor unit via the first conduit, the nanoporous thin film and the second conduit.

7. The nanoporous thin film according to claim 6, wherein the composite photocatalyst structure comprises the metal-oxide-based photocatalyst layer and the metal-based photocatalyst layer.

8. The nanoporous thin film according to claim 6, wherein the metal-based photocatalyst layer includes a plurality of metal photocatalyst particles, each of which particles have a particle diameter in a range between 0.5 nm~100 nm.

9. The nanoporous thin film according to claim 6, wherein each of the through-nanopores have a tube with the inner tube wall therein and the tube has a tube diameter in a range between 11 nm~200 nm and a tube length in a range between 0.001 cm~10 cm.

10. The nanoporous thin film according to claim 6, wherein the nanoreactor unit further comprises:
    a spacer sheet having a center part and an open hole disposed at the center part, in which the nanoreactor is placed on the spacer sheet and situated correspondingly at the center part.

11. The nanoporous thin film according to claim 6, wherein there are multiple nanoreactor units arranged in a configuration selected from a group consisting of a serial configuration, a parallel configuration, a hybrid configuration of the serial and parallel configurations, an array configuration and a combination thereof.

12. The nanoporous thin film according to claim 6, wherein there are multiple nanoreactors arranged in a configuration selected from a group consisting of a serial configuration, a parallel configuration, a hybrid configuration of the serial and parallel configurations, an array configuration and a combination thereof.

13. The nanoporous thin film according to claim 6, wherein the nanoreactor unit is included in a nanoreactor system and the nanoreactor system comprises:
    a reservoir connected with the first conduit and used for storing the reactant fluid; and
    a pump connected with the second conduit and used for providing a suction force to the reactant fluid so as to drive it to flow through the nanoreactor.

14. The nanoporous thin film according to claim 13, wherein the nanoreactor system further comprises the plurality of the nanoreactor units.

15. The nanoporous thin film according to claim 6, wherein the nanoreactor has an ability to photodegrade 27.7% of a contaminant off within $2.7 \times 10^{-2}$ second.

* * * * *